US011556847B2

(12) United States Patent
Farchi et al.

(10) Patent No.: US 11,556,847 B2
(45) Date of Patent: Jan. 17, 2023

(54) METHOD AND APPARATUS FOR EMPLOYING MACHINE LEARNING SOLUTIONS

(71) Applicant: International Business Machines Corporation, Armonk, NY (US)

(72) Inventors: Eitan Daniel Farchi, Pardes Hana (IL); Howard Michael Hess, Winnetka, IL (US); Orna Raz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 16/655,319

(22) Filed: Oct. 17, 2019

(65) Prior Publication Data
US 2021/0117848 A1 Apr. 22, 2021

(51) Int. Cl.
*G06N 20/00* (2019.01)
*G06F 11/34* (2006.01)
*G06N 5/04* (2006.01)

(52) U.S. Cl.
CPC ........ *G06N 20/00* (2019.01); *G06F 11/3466* (2013.01); *G06N 5/04* (2013.01)

(58) Field of Classification Search
CPC ...... G06N 20/00; G06N 5/04; G06F 11/3466; G06F 11/3006; G06F 11/3409
USPC ..................................................... 706/10–44
See application file for complete search history.

(56) References Cited

U.S. PATENT DOCUMENTS

2016/0303483 A1* 10/2016 Snoddy ................. G06N 3/006
2017/0308800 A1* 10/2017 Cichon ................. G06N 20/00
2018/0130186 A1* 5/2018 Romanenko ............ G06T 5/002
2019/0050319 A1* 2/2019 Gondalia ............ G06F 11/3664
2019/0295000 A1* 9/2019 Candel .................... G06N 5/003
2020/0021873 A1* 1/2020 Swaminathan .......... G06N 3/08
2020/0152328 A1* 5/2020 Bender ............... G06F 21/6218
2020/0250562 A1* 8/2020 Bly ........................ G06N 5/022
2020/0274894 A1* 8/2020 Argoeti ................. H04L 63/102
2020/0334580 A1* 10/2020 Sheopuri ............. G06Q 10/063

FOREIGN PATENT DOCUMENTS

CN 109582294 4/2019

OTHER PUBLICATIONS

Liu, Ce, et al. "Automatic estimation and removal of noise from a single image." IEEE transactions on pattern analysis and machine intelligence 30.2 (2007): pp. 299-314. (Year: 2007).*

Mac Aodha, Oisin, et al. "Putting the scientist in the loop—Accelerating scientific progress with interactive machine learning." 2014 22nd International Conference on Pattern Recognition. IEEE, 2014.pp.9-17 (Year: 2014).*

(Continued)

*Primary Examiner* — Satish Rampuria
(74) *Attorney, Agent, or Firm* — Ziv Glazberg

(57) ABSTRACT

A method, system and computer program product, the method comprising: obtaining computer code of an employed system comprising a plurality of components; obtaining data related to operating the plurality of components; based on the computer code and the data, identifying: a first component from the plurality of components, to be maintained; and a second component from the plurality of components, to be at least partly replaced by a machine learning component; and providing to a user an identification of the first component and the second component.

20 Claims, 2 Drawing Sheets

(56) References Cited

OTHER PUBLICATIONS

Figure 1:
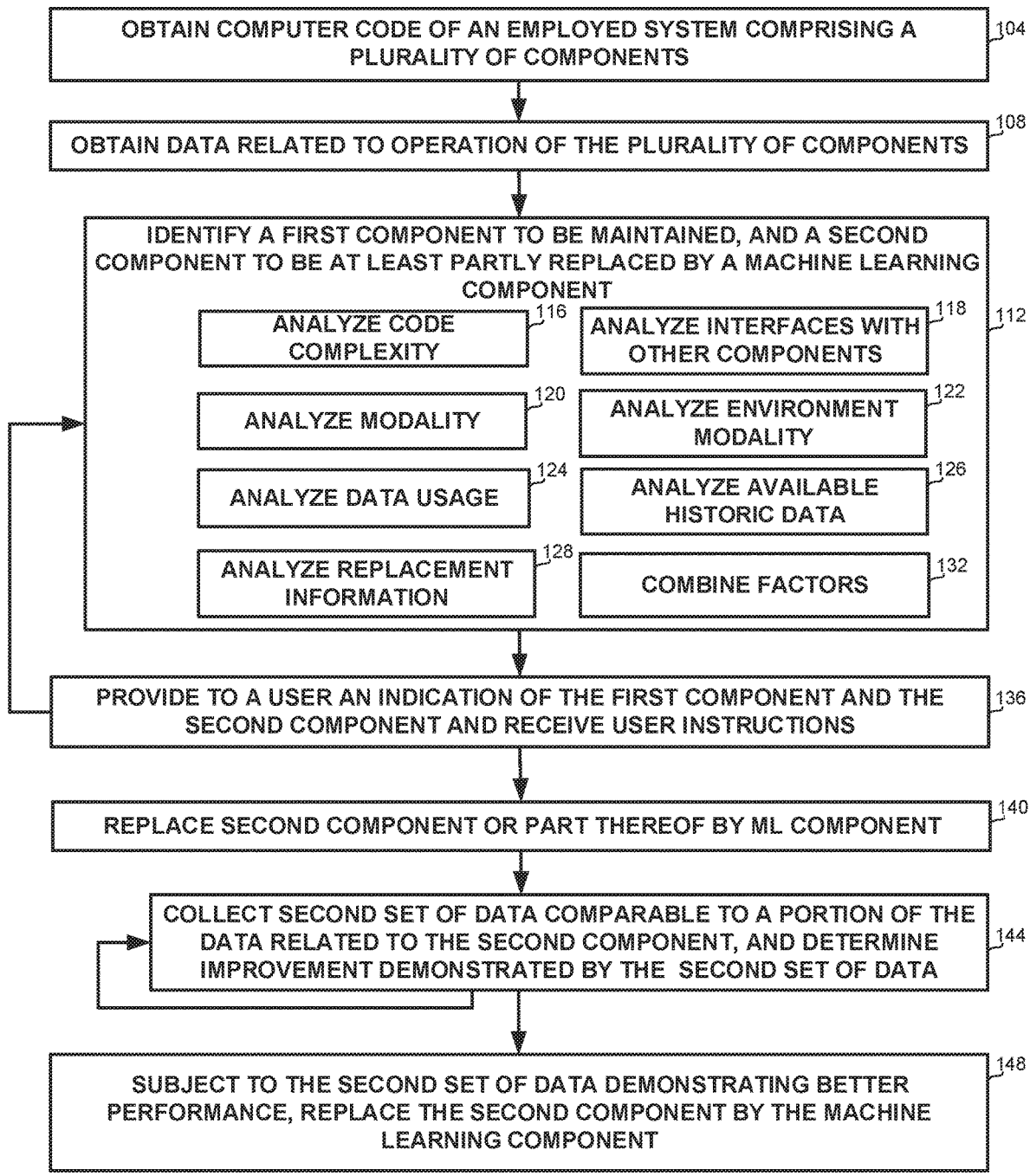

Teng, Kezhen, et al. "Mask assisted object coding with deep learning for object retrieval in surveillance videos." Proceedings of the 22nd ACM international conference on Multimedia. 2014.pp. 1109-1112 (Year: 2014).*

Yeo, Hyunho, Sunghyun Do, and Dongsu Han. "How will deep learning change internet video delivery?." Proceedings of the 16th ACM Workshop on Hot Topics in Networks. 2017.pp.57-64 (Year: 2017).*

Chen, Zhengzhang, et al. "NUMARCK: machine learning algorithm for resiliency and checkpointing." SC'14: Proceedings of the International Conference for High Performance Computing, Networking, Storage and Analysis. IEEE, 2014.pp.733-744 (Year: 2014).*

Jing, Longlong, and Yingli Tian. "Self-supervised visual feature learning with deep neural networks: A survey." IEEE transactions on pattern analysis and machine intelligence 43.11 (2020): pp. 4037-4058. (Year: 2020).*

Jonathan Moran, "Blog: Earnix Provides the Best of Both Worlds with Hybrid Modeling Capabilities", Earnix.com. Available at: https://earnix.com/earnix-provides-best-worlds-hybrid-modeling-capabilities/ (as of Oct. 16, 2019).

* cited by examiner

METHOD AND APPARATUS FOR EMPLOYING MACHINE LEARNING SOLUTIONS

TECHNICAL FIELD

The present disclosure relates to computer systems in general, and to a method and apparatus for employing components implementing machine learning techniques in existing systems, in particular.

BACKGROUND

Computerized devices control almost every aspect of our life—from writing documents to controlling traffic lights. In particular, a computerized system is the backbone of any organization, and in particular large ones, such as financial institutes for example banks or insurance companies, governmental organizations, pharmaceutical companies, health care institutes such as hospitals, or others, and in particular institutes maintaining databases comprising large quantities of data.

Such institutes have to comply with many requirements and constraints related to the computerized systems, the first of which is to provide the required functionality for an abundance of tasks, needs and subjects. In addition, the systems may have to take care of other tasks such as maintaining the privacy of individuals and organizations, complying with all sorts of regulations related such as documentation maintenance and archiving, and many others. Even further, huge amounts of data collected over the years, which may relate to the institute, its employees, clients, associates, scientific data, business data, or the like may have to be maintained, backed up regularly, or the like.

As a result, the computing systems of such organizations comprise legacy systems which are decades old and deeply rooted within the organization, meaning they are very hard to replace. On the other hand, maintaining such systems becomes more and more difficult, as modern infrastructures do not provide the required support, and particularly because developers that know the systems and the relevant programming languages and paradigms are retiring, and younger ones are not proficient in these environments. Therefore, there are less and less programmers who can maintain the systems, implement required changes, fix bugs, or the like. In addition, such systems do not enjoy the plethora of modern tools which can improve the financial, scientific or other service or results, save time, manpower and money, or provide other advantages.

BRIEF SUMMARY

One exemplary embodiment of the disclosed subject matter is a computer-implemented method comprising: obtaining computer code of an employed system comprising a plurality of components; obtaining data related to operating the plurality of components; based on the computer code and the data, identifying: a first component from the plurality of components, to be maintained; and a second component from the plurality of components, to be at least partly replaced by a machine learning component; and providing to a user an identification of the first component and the second component.

Another exemplary embodiment of the disclosed subject matter is a system having a processor, the processor being adapted to perform the steps of: obtaining computer code of an employed system comprising a plurality of components; obtaining data related to operating the plurality of components; based on the computer code and the data, identifying: a first component from the plurality of components, to be maintained; and a second component from the plurality of components, to be at least partly replaced by a machine learning component; and providing to a user an identification of the first component and the second component.

Yet another exemplary embodiment of the disclosed subject matter is a computer program product comprising a non-transitory computer readable medium retaining program instructions, which instructions when read by a processor, cause the processor to perform: obtaining computer code of an employed system comprising a plurality of components; obtaining data related to operating the plurality of components; based on the computer code and the data, identifying: a first component from the plurality of components, to be maintained; and a second component from the plurality of components, to be at least partly replaced by a machine learning component; and providing to a user an identification of the first component and the second component.

THE BRIEF DESCRIPTION OF THE SEVERAL VIEWS OF THE DRAWINGS

Figure 2:
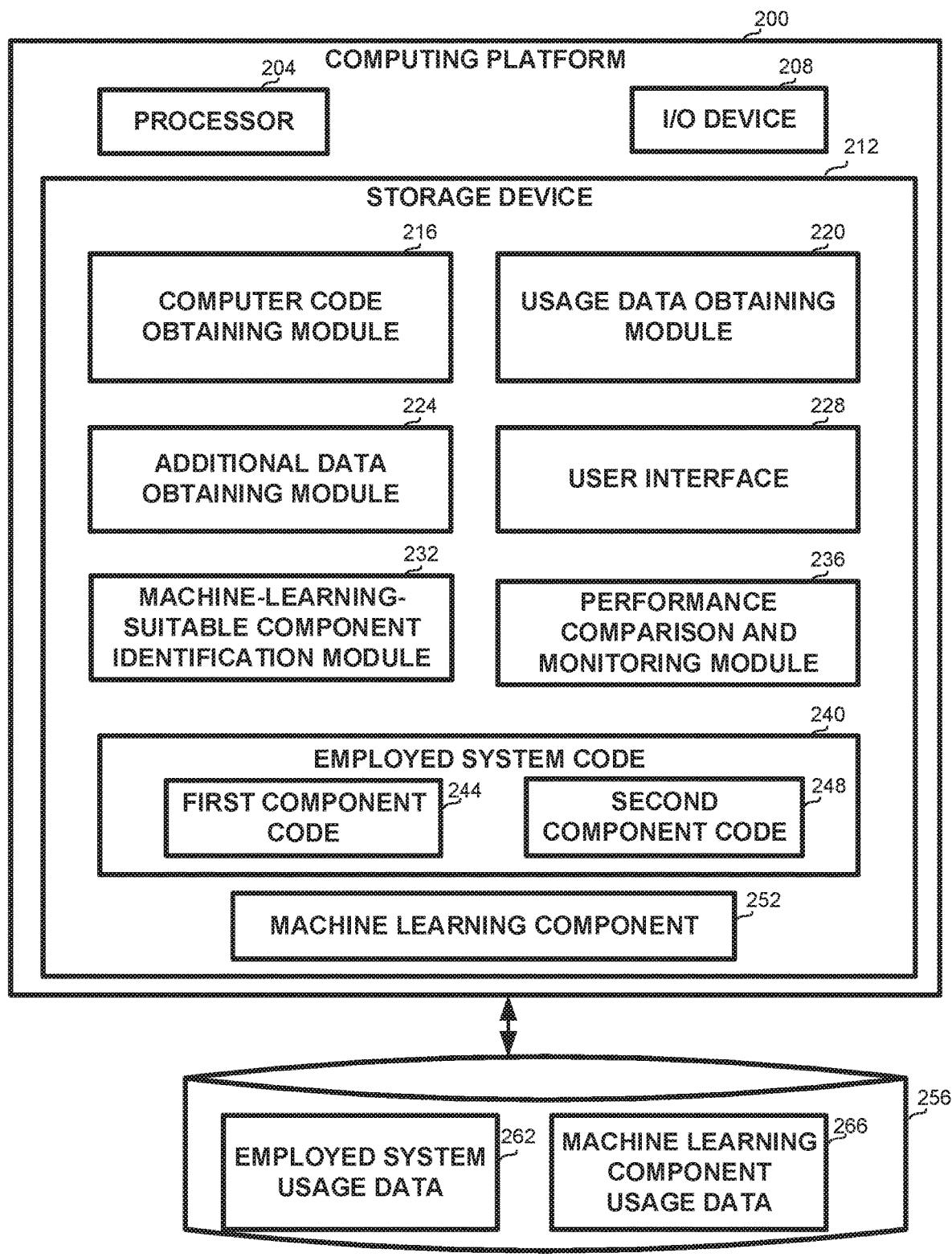

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a flowchart diagram of a method for employing a machine learning component in a computing system, in accordance with some exemplary embodiments of the disclosed subject matter; and FIG. 2 showing a block diagram of a system configured for employing a machine learning component in an employed computing system, in accordance with some exemplary embodiments of the disclosed subject matter.

DETAILED DESCRIPTION

Legacy systems employed by large organizations usually comprise many parts or modules, referred to as components, which perform many functions, and create and use significant amounts of data over the years. These factors, in addition to the ongoing requirements for proper operation, and compliance with all internal and external rules and regulations, make modernizing such systems very challenging.

However, such modernization may become necessary as the maintenance of such systems becomes harder and harder due to shortage of programmers familiar with the used systems, environments and programming languages, lack of infrastructure support, or the like. On the other hand, new and highly productive and successful technologies emerge constantly, and can be made to good use for such organizations. For example, technologies that user artificial intelligence (AI) and in particular machine learning (ML) may be useful in multiple operations of many institutions.

ML systems is a general name for methods, algorithms and devices executed by computers performing specific tasks, while relying on patterns and inference rather than explicit instructions. Machine learning algorithms build a mathematical model based on sample data, known as "training data", and use the model in order to make predictions or decisions without being explicitly programmed to perform the task. Machine learning algorithms are used in a wide variety of applications, especially where it is difficult or infeasible to develop a conventional or explicit algorithm for effectively performing the task. Such applications may include but are not limited to filtering items, computerized vision, data mining which relates to making predictions based on past cases, or the like.

Two main types of machine learning include supervised learning and unsupervised learning. In supervised learning, the machine builds a mathematical model from a set of data that contains both the inputs and the desired outputs. For example, if the task is determining whether an image contains a certain object, the training data for a supervised learning algorithm can include images with and without that object (input), and a label associated with each image designating whether it contains the object (output). In unsupervised learning, the machine builds a mathematical model from a set of data which contains only inputs and no desired output. Unsupervised learning algorithms are used to structure the data, for example by grouping or clustering similar items, thus discovering patterns and important features within the data.

One technical problem is thus a need to modernize at least a part of a legacy computer system employed by an organization, in order to be able to continue maintaining and supporting the system, as well as to enjoy the many benefits offered by modern and advanced algorithms, methodologies, or the like, and particularly those employing ML.

It will be appreciated that such technologies may be more adequate for certain operations than for other. For example, critical or real time operations, or operations that require 100% precision, such as balancing accounts, may be less adequate for AI technologies than operations such as considering a client's request for a loan.

One technical solution comprises the identification of one or more components or component parts of a computerized system which are more adequate for keeping, and one or more components or component parts that are more adequate for being replaced by a modern component, for example a component that employs ML techniques. The components or parts which are more adequate for replacing may be identified in accordance with a number of factors, such as but not limited to any one or more of the following: a component being used for critical tasks, real time tasks, or tasks which require 100% precision, for example account balancing, may not be a good candidate for being replaced; complexity of the code implementing the component, such that more components employing more complex logic are more adequate for being replaced; level of interface with other components, wherein components that are more standalone and have little interface with other components are more adequate for being replaced; data modalities used by the component or part thereof, such that certain data modalities such as images or voice are more adequate for being replaced as new image analysis or voice analysis techniques may be employed; operation environment of the component, such that components operative in one environment are more adequate for being replaced than others; amount of historic data used and created by the component, wherein a component for which more data exists is more adequate to being replaced; components for which experience has been gathered for possible replacement ML components may be more adequate to being replaced; a component that has functionality that is similar to a component that has been recognized as adequate for replacement in other reemployed systems, may be more adequate for replacement in the current system as well; a user indication of a component as a good or bad candidate for replacement, or the like. One or more of these factors and possibly additional ones may be considered and a grade can be assigned to each of the factors in association with each component. The grades associated with each component may then be combined, for example averaged, summed, summed with weights, or the like. Components that have higher combined grades may be better candidates for replacement than components having a lower grade. A user may then be provided with a recommendation for which components should be replaced. The user may further be provided with a recommendation for a specific component to replace the component selected for replacement (referred to as the selected component) or part thereof, an algorithm, a technology, or the like. The user may accept or reject the recommendations, change parameters or weights, or otherwise affect the grading and the selection.

Another technical solution comprises monitoring the performance of the ML component. For example, the ML component can be deployed and operated for a period of time, instead of or side by side with the selected component. The performance of the ML component and the selected component may then be compared. Comparison may be performed on the same cases, by averaging performance grades for a multiplicity of cases, or the like. A user may be notified of the relative performance of the ML component and the selected component. Once the performance of the ML component is substantially equal to or exceeds that of the selected component, the selected component can be replaced by the ML component.

The ML component can be further improved at a later time, by employing continuous supervised or unsupervised training on further cases. The cases may be obtained from the same deployed system, as well as from other systems, for example other branches of the organization, similar organizations, or the like. Thus, even if the ML component performance is insufficient for replacing the selected component at a certain point in time, the ML component may be further trained, such that its performance may be sufficient at a later point of time.

One technical effect of the disclosure is the provisioning of an automatic or semi-automatic method and system of recognizing components that make good candidates for being replaced by an AI component, without requiring thorough understanding of the system components.

Another technical effect of the disclosure is the identification of a component which processes data of one or more modality types, or in one or more environments, such that the parts of the components processing data of one or more modality types or operative in a certain environment are adequate for being replaced.

Yet another technical effect of the disclosure is the automatic or semi-automatic monitoring of the ML component over time, such that it may fully replace the selected component only once its performance is sufficient.

Yet another technical effect of the disclosure is the option for monitoring the improvement trajectory of the component over time, and further training the ML component, such that its performance may keep improving. ML components demonstrating satisfactory performance or satisfactory performance improvement over time in one system or environment, may also be better candidates for replacing similar components in another system or environment. The data used for improving the component may also be used for improving the performance of the component in another system or environment.

Referring now to FIG. 1, showing a flowchart diagram of a method for employing a machine learning component in a computing system, in accordance with some exemplary embodiments of the disclosed subject matter.

On step 104, computer code of an employed system, comprising a plurality of components can be obtained. The computer code may be obtained from a computerized system of any institute, and in particular an institute collecting and maintaining significant amount of data, for example a financial institute such as a bank or an insurance company, a governmental organization, a pharmaceutical company, a healthcare institute such as a hospital, or the like.

The code may be obtained from any local or remote storage device via any communication channel. The code may be in any one or more supported programming languages, such as Cobol, Fortran, Pascal, C, C++, Java, or others. The code may be arranged in files, folders, units, disks or other. In addition, the association between the code and components may be provided, for example in a list detailing explicitly the files associated with each component, in a "make" file or a similar file indicating the files that need to be included or compiled for each component, or the like.

On step 108, data related to the operation of the plurality of components can be obtained. The data may comprise, for one or more components, the inputs and outputs related to a plurality of operations, for example the data used for each operation and the numbers, decision, documents or any other output generated by the component in response to the input. For example, an accounting component may receive a previous balance and a plurality of transactions, and may output a current balance. A credit approval component may receive data related to the credit history of a client, information about past billings and payments, current obligations, or the like, and may output a yes/no credit card approval, and/or a credit limit.

On step 112, a first component to be maintained and a second component to be at least partly replaced by a corresponding ML component may be identified. In some embodiments, all components of the system may be reviewed, and each may be assigned a grade indicating how suitable it is to be replaced, or how suitable a part of it is to be replaced. Thus, in some embodiments, the steps detailed below may be performed for each component. In further embodiments, only certain components may be indicated by a user to be reviewed.

On step 116, the code complexity, or the logic complexity of a component may be determined. The code complexity may be determined using static analysis of the code. The code complexity may be determined using a metrics based on any one or more of the following, or additional factors: the length of the code; the number of files of the component; the number of function or method invocations; the number and type of used control flow constructs such as if-then, if-then-else, while, for, with, or other constructs; the complexity of object hierarchy; or the like. Components that are relatively of higher complexity may be more suitable for being replaced by an ML component. For example, only components which have a complexity measure exceeding a threshold may be considered and graded.

On step 118, the level of interfacing with other components may be determined, and particularly the level of interactions initiated by the component, i.e., the number or frequency of calls the component makes to functions or methods in other components. A component that has a lower level of interactions, i.e., is more self-contained and makes fewer calls to external executable units, may be more suitable for being replaced by an ML component. For example, only components which have a level of interactions with other components which does not exceed a threshold may be considered and graded.

On step 120, the modality of the data used by the code may be determined and used. Less structured data may be more suitable for being replaced by an ML component. For example, components handling image or voice may be more suitable for being replaced, as they can more efficiently carry out advanced analyses such as image of voice analysis. On the other hand, components handling more structured data, such as tabloid data, may in some situations be less suitable for being replaced by a ML component. Components handling some types of data, such as text, sensory data received from one or more sensors, or others may be more or less suitable for ML, depending for example on other criteria, user preferences, experience gathered for similar components in other systems, or the like. The type of data handled by a component may be recognized in accordance with libraries, functions or other units called for handling the data, typical variable names or parts thereof, such as variable name containing the string "image", or "audio: may indicate analysis of the corresponding input types. It will be appreciated that if one component handles data of multiple types, some types may be identified as more suitable to being replaced than others, such that only some parts of the component may be replaced while others may be maintained.

On step 122, the type of the environment in which the component is used may be determined and used. For example, a component operating in a development environment or testing environment be more suitable for being replaced by a ML component than a component operating in a deployment environment. The environment type may be identified in accordance with the invoked libraries, the target storage of the output, variable or function names, auxiliary files such as configuration files, or the like.

It will be appreciated that if one component is used in multiple environment modalities, it may be more suitable to being replaced in some of them, for example in a development environment, than in others, such as deployment environment. Thus the component may be replaced in an ML component in some environments but not in others.

On step 124, the data usage made by the component may be evaluated, e.g., the amount of data required by the component for executing its functionality may be evaluated. The amount of data may be measured in the volume of data, in the number of data items, or the like. Components using relatively a large amount of data, including non-structured data, may be more suitable for being replaced by an ML component. Additionally, the data or decisions output by the component may be received, evaluated and influence the grade as well.

On step 126, the amount of available historical data used and created by the component may be evaluated. Components that have been in extensive use, and have used and created more data than others, may be more suitable for being replaced by an ML component. For example, only components which have used or generated volume of data exceeding a threshold may be considered and graded.

On step 128 replacement information of a component may be considered. Components that are recommended to be replaced by a user, or have been replaced in other institutes or systems, and in particular those that provided satisfactory results, may be more suitable for being replaced by an ML component. The user may also indicate components not to be replaced by ML components, such as accounting components, personal data management component of healthcare patient, or the like.

It will be appreciated that steps 116, 118, 120, 122, 124 and 128 are exemplary only, and any subset and/or additional steps may be performed for evaluating the suitability of a component for being replaced by an ML component.

On step 132, any one or more of the suitability factors detailed above, and optionally additional ones, may be combined to provide one or more total grades for the suitability of each component for being replaced by an ML component.

On step 136 the components and their respective grades may be provided to a user, for example displayed, stored in a file, or the like. One or more first components having lowest grades of suitability for being replaced by an ML component may be indicated, and one or more second components having highest grades of suitability for being replaced by an ML component, may be indicated. The user may accept or reject the suggested components, may change the weights between the factors, may add or discard certain information, or provide any other instructions. In response to the user's input, one or more of steps 116, 118, 120, 122, 124, 128 and 132 may be repeated iteratively, until the user approves the components to be replaced.

In some embodiments, the user may be presented with the option to provide input only if the factor combination yields undecided results. For example, two thresholds may be provided, such that if the grade associated with a component is above the higher threshold the component will be replaced, if the grade is below the lower threshold the component will not be replaced, and if the grade is between the high and the low thresholds, a user may be presented with the grades, and make a decision, or change parameters, weights, or the like.

On step 140, the corresponding ML component may be employed instead of each second component or part thereof to be replaced. In some embodiments, the ML component can be employed side by side with the second component, in order to ensure service, while evaluating the ML component.

It will be appreciated that while some of the component identification is based on the code of each component, the component replacement may be between executables implementing the component to be replaced and the ML component.

On step 144, a second set of data, related to operating the ML component may be collected, similarly to the data used on step 124 for evaluating data usage of the component or part thereof. The second set of data and the portion of the data evaluated on step 124 may be compared. Comparison may relate to the output of the components, and may use human or other decision mechanisms and metrics of which component performs better. Comparison may also be against results obtained by the activation of the ML component on past cases, and testing its output against the output of the component being replaced. A user may be presented with the comparison results, may provide instructions on how to operate the second component and the ML component, how to perform the comparison, or the like.

Data collection and comparison step 144 may be repeated with the ML component and the component being replaced operating side by side, optionally with gradual phase out of the component being replaced. The performance improvement trajectory of the component may be monitored over time, for example until any one or more of the following stopping criteria is met: the ML component performance is equal to or exceeds the performance of the replaced component or the ML component performance has improved to at least a predetermined degree; no satisfactory improvement is determined in the performance of the ML performance, or a predetermined time or a predetermined number of iterations have been performed.

On step 148, subject to the ML component demonstrating better performance, for example if the observed stopping criteria is that the ML component performance is equal to or exceeds the performance of the replaced component or the ML component performance has improved to at least a predetermined degree, the second component or the relevant part thereof may be replaced and used permanently instead of the second component or the corresponding part thereof.

In some embodiments, the ML component which demonstrated satisfactory performance or satisfactory improvement over time may later be employed in another system, optionally with required changes, instead of a corresponding component.

Referring now to FIG. 2 showing a block diagram of a system configured for employing a machine learning component in a computing system, in accordance with some embodiments of the disclosure.

The system may comprise one or more Computing Platforms 200. In some embodiments, computing platform 200 may be a server, and provide services to one or more computer networks associated with one or more organizations. In further embodiments, Computing Platform 200 may be the same, or one of the computing platform executing the tasks for an institute.

Computing Platform 200 may communicate with other computing platforms via any communication channel, such as a Wide Area Network, a Local Area Network, intranet, Internet or the like.

Computing Platform 200 may comprise a Processor 204 which may be one or more Central Processing Units (CPU), a microprocessor, an electronic circuit, an Integrated Circuit (IC) or the like. Processor 204 may be configured to provide the required functionality, for example by loading to memory and activating the modules stored on Storage Device 212 detailed below.

It will be appreciated that Computing Platform 200 may be implemented as one or more computing platforms which may be operatively connected to each other. It will also be appreciated that Processor 204 may be implemented as one or more processors, whether located on the same platform or not.

Computing Platform 200 may comprise Input/Output (I/O) Device 208 such as a display, a pointing device, a keyboard, a touch screen, or the like. I/O Device 208 may be utilized to receive input from and provide output to a user, for example receive parameters r weights from a user, receive recommendation from a user to a component to be replaced, show to a user the grades associated with one or more components, show the performance of ML components, or the like.

Computing Platform 200 may comprise a Storage Device 212, such as a hard disk drive, a Flash disk, a Random Access Memory (RAM), a memory chip, or the like. In some exemplary embodiments, Storage Device 212 may retain program code operative to cause Processor 204 to perform acts associated with any of the modules listed below, or steps of the method of FIG. 1 above. The program code may comprise one or more executable units, such as functions, libraries, standalone programs or the like, adapted to execute instructions as detailed below.

Storage Device 212 may comprise Employed System Code 240, storing the code of the components of the employed system, such as First Component Code 244 and Second Component Code 248. It will be appreciated that the code of multiple components may be stored, although it is a-priori unknown which components are to be maintained (first component) and which are to be replaced (second component).

Storage Device 212 may comprise Machine Learning Component 252 which may replace an executable component associated with Second Component Code 248.

A system in accordance with the disclosure may also comprise or operatively communicate with Database 256 storing operational data of the system, e.g., customer accounts, customer personal, health, financial or other data, billing data, experimental results, or the like. In particular, Database 256 may comprise Employed System Usage Data 262, storing existing data used or created by any one or more components of the employed system, or other systems which are similar or relevant, and Machine Learning Component Usage Data 266 comprising data used or created by any of the ML components in the current systems or in comparable systems. Database 256 may be implemented as part of Storage Device 212, or as one or more separate devices operatively communicating with Storage Device 212.

Storage Device 212 may comprise Computer Code Obtaining Module 216 for obtaining the computer code of one or more components or one or more computerized systems associated with the organization, as described in association with step 104 of FIG. 1 above.

Storage Device 212 may comprise Usage Data Obtaining Module 220 for obtaining usage data related to the components obtained by Computer Code Obtaining Module 216. The usage data may be obtained, for example, from Employed System Usage Data 262.

Storage Device 212 may comprise Additional Data Obtaining Module 224 for obtaining additional data, for example from a user. The additional data may include component recommendation, constraints, parameters, weights, or the like.

Storage Device 212 may comprise User Interface 228 for receiving input and providing output to a user. For example, a user may be presented with a list of components, an option to provide a recommendation for replacing a component with an ML component; the grade assigned to each component; performance comparison between a replaced component and a corresponding ML component; a graph or another representation of the change in performance of the ML component over time, or the like. User Interface 228 may thus be useful in receiving user instructions for selecting the components to be replaced, and in displaying to the user and receiving user input related to the performance comparison as detailed in association with steps 140 and 144 above.

Storage Device 212 may comprise ML Suitable Component Identification Module 232 for associating a grade with each component or part thereof, the grade indicating how suitable the component or part thereof is for being replaced with an ML component, as detailed in association with steps 112, 116, 118, 120, 122, 124, 128 and 132 above.

Storage Device 212 may comprise Performance Comparison and Monitoring Module 236 for comparing the performance of the ML component with the performance of the corresponding component being a candidate for replacement, or part thereof, and monitoring the same over time. Comparison may relate to comparing the results of executing the two components on the same cases, executing the ML component on cases previously handled by the component to be replaced, or the like. Comparison may also relate to a part of the component. For example, in a component handing a multiplicity of modalities such as images, audio and tabloid data, that has been partly replaced with a component using ML for the image and audio data, and uses traditional methods for the tabloid data, performance may be compared for the image and audio analysis, and not to the tabloid data. Monitoring the performance over time provides for determining whether and when the component is to be permanently replaced, discarded, or monitoring should be continued.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining computer code of an employed system comprising a plurality of components, wherein the plurality of components comprises at least one non-Artificial Intelligence (AI) component;
    obtaining data related to operating the plurality of components;
    based on the computer code and the data, identifying by a processor:
        a first component from the plurality of components, to be maintained; and
        a second component from the plurality of components, to be at least partly replaced by a machine learning component, wherein the at least one non-AI component comprises the second component; and
    automatically modifying the computer code of the employed system based on said identifying, wherein said automatically modifying comprises:
        maintaining the first component in the computer code; and
        replacing at least a portion of the second component by the machine learning component;
    whereby improving a performance of the employed system.

2. The method of claim 1, wherein said identifying that the second component is to be at least partly replaced by the machine learning component is performed based on the second component being configured to process image data or audio data.

3. The method of claim 1, wherein said identifying that the first component is to be maintained is performed based on the first component being configured to process tabloid data, text or sensory data.

4. The method of claim 1, wherein said identifying that the first component to be maintained or the second component to be at least partly replaced by the machine learning component comprises receiving instructions from a user;

wherein said automatically modifying the computer code of the employed system is performed based on the instructions received from the user.

5. The method of claim 4, wherein identifying the first component to be maintained or the second component to be at least partly replaced by the machine learning component and said automatically modifying the computed code based on the instructions received from the user are performed iteratively.

6. The method of claim 1, further comprising:
collecting a second set of data related to operating the machine learning component within the employed system;
comparing the second set of data to a portion of the data related to the second component; and
subject to the second set of data demonstrating better performance of the machine learning component than the second component, recommending to a user to replace the second component by the machine learning component.

7. The method of claim 6, wherein said collecting and comparing is repeated until a stopping criterion has been met, and wherein said recommending is performed subject to a satisfactory improvement in the performance of the machine learning component.

8. The method of claim 1, wherein the second component is a non-AI component, whereby replacing the non-AI component with an AI component.

9. The method of claim 1, wherein said identifying that the second component is to be at least partly replaced by the machine learning component is performed based on the second component requiring a volume of data exceeding a predetermined threshold.

10. The method of claim 1, wherein said identifying that the second component is to be at least partly replaced by the machine learning component is performed based on a metric of code complexity of code associated with the second component, exceeding a predetermined threshold.

11. The method of claim 10, wherein the code complexity is measured by static analysis.

12. The method of claim 1, wherein said identifying that the second component is to be at least partly replaced by the machine learning component is performed based on the second component requiring interactions with other components being below a predetermined threshold.

13. The method of claim 1, wherein said identifying that the second component is to be at least partly replaced by the machine learning component is performed based on the volume of data related to historic operation of the second component exceeding a predetermined threshold.

14. The method of claim 1, further comprising providing to the user details of the machine learning component.

15. The method of claim 14, wherein the details of the machine learning component comprise an algorithm to be used.

16. The method of claim 14, wherein the details of the machine learning component comprise suggested parameters of an algorithm to be used.

17. A system having a processor, the processor being adapted to perform the steps of:
obtaining computer code of an employed system comprising a plurality of components, wherein the plurality of components comprises at least one non-Artificial Intelligence (AI) component;
obtaining data related to operating the plurality of components;
based on the computer code and the data, identifying, by the processor:
a first component from the plurality of components, to be maintained; and
a second component from the plurality of components, to be at least partly replaced by a machine learning component, wherein the at least one non-AI component comprises the second component; and
automatically modifying the computer code of the employed system based on said identifying, wherein said automatically modifying comprises:
maintaining the first component in the computer code; and
replacing at least a portion of the second component by the machine learning component;
whereby improving a performance of the employed system.

18. The system of claim 17, wherein said identifying that the first component is to be maintained is performed based on the first component being configured to process tabloid data, text or sensory data, and wherein said identifying that the second component is to be at least partly replaced by the machine learning component is performed based on the second component being configured to process image data or audio data.

19. The system of claim 17, wherein the processor is further adapted to perform:
collecting a second set of data related to operating the machine learning component within the employed system;
comparing the second set of data to a portion of the data related to the second component; and
subject to the second set of data demonstrating better performance of the machine learning component than the second component, recommending to a user to replace the second component by the machine learning component.

20. A computer program product comprising a non-transitory computer readable medium retaining program instructions, which instructions when read by a processor, cause the processor to perform:
obtaining computer code of an employed system comprising a plurality of components, wherein the plurality of components comprises at least one non-Artificial Intelligence (AI) component;
obtaining data related to operating the plurality of components;
based on the computer code and the data, determining, by the processor:
a first component from the plurality of components, to be maintained; and
a second component from the plurality of components, to be at least partly replaced by a machine learning component wherein the at least one non-AI component comprises the second component; and
automatically modifying the computer code of the employed system based on said identifying, wherein said automatically modifying comprises:
maintaining the first component in the computer code; and
replacing at least a portion of the second component by the machine learning component;
whereby improving a performance of the employed system.

* * * * *